United States Patent [19]

Huntley

[11] Patent Number: 5,494,647
[45] Date of Patent: Feb. 27, 1996

[54] USE OF CHELEX-100 FOR SELECTIVELY REMOVING Y-90 FROM ITS PARENT SR-90

[75] Inventor: Mark W. Huntley, Idaho Falls, Id.

[73] Assignee: The United States of America as represented by the United States Department of Energy, Washington, D.C.

[21] Appl. No.: 131,185

[22] Filed: Oct. 4, 1993

[51] Int. Cl.$^6$ .............................. C01F 13/00; C01F 15/00
[52] U.S. Cl. ............................................................ 423/2
[58] Field of Search ...................................... 423/1, 2, 21.5

[56] References Cited

U.S. PATENT DOCUMENTS

| | | | |
|---|---|---|---|
| 4,202,743 | 5/1980 | Oda et al. | 204/98 |
| 4,423,159 | 12/1983 | Ebra et al. | 521/35 |
| 5,310,486 | 5/1994 | Green et al. | 210/638 |

OTHER PUBLICATIONS

Ion Exchange Tests for Removing $^{90}$Sr and Pu from Stored Waste Supernates, Savannah River Laboratory Quarterly Report, Waste Management, Apr.–Jun. 1975, pp. 24–25.
An Evaluation of Column Methods for the Separation of Sr–90/Y–90 in Environmental Waste Streams, Mark W. Huntley, viewgraphs of presentation made to U.S. Department of Energy Conference on Analytical Chemistry, Oct. 6, 1993.
Zhongqian et al., "Separation of Strontium–90 and Yttrium–90 on P507 Resin," Yuanzineng Kexue Jishu (1991), 25(4), 89–91.
Haggin, "New Process Makes High Purity Yttrium–90", Chemical & Engineering News, Aug. 20, 1990, p. 8.

*Primary Examiner*—Donald P. Walsh
*Assistant Examiner*—Anthony R. Chi
*Attorney, Agent, or Firm*—Mark P. Dvorscak; Robert J. Fisher; William R. Moser

[57] ABSTRACT

A method for selectively removing yttrium-90 from its parent strontium-90 contained in an environmental sample includes loading the sample onto a column containing a chelating ion-exchange resin capable of retaining yttrium-90; washing the column with a solution capable of removing strontium, calcium, and other contaminants from the yttrium-90 fraction retained on the column; removing excess acetate salts from the column; eluting yttrium-90 solution from the column and adjusting the pH of this solution to about 2.7; filtering the yttrium-90 solution and weighing this solution for gravimetric yield; and, counting the yttrium-90 containing solution with a radiological counter for a time sufficient to achieve the statistical accuracy desired. It is preferred that the chelating ion-exchange resin is a bidente ligand having the chemical name iminodiacetic acid mounted on a divinyl benzene substrate, converted from sodium form to ammonia form.

4 Claims, No Drawings

5,494,647

USE OF CHELEX-100 FOR SELECTIVELY REMOVING Y-90 FROM ITS PARENT SR-90

CONTRACTUAL ORIGIN OF THE INVENTION

The United States Government has rights in this invention pursuant to Contract No. DE-AC07-84ID12435 between the U.S. Department of Energy and Westinghouse Electric Company.

BACKGROUND OF THE INVENTION

This invention relates to a method to purify Yttrium-90 from its parent, Strontium-90. More specifically, the invention relates to the use of a non-hazardous, commercially available material, to achieve this separation.

Yttrium-90 is a nuclide having important uses in radioactive assays as well as in medicine for a biological tracer. Strontium-90 and Yttrium-90 can be found in many environmental samples such as water, vegetation, and soil.

Separation of Yttrium-90 from its parent Strontium-90 is done with various materials. Most Strontium-90 procedures are precipitation procedures. The classic technique is the use of fuming nitric acid. HDEHP, as well as the use of crown ethers, are other materials that can be used. However, all of the materials used for this separation are listed as hazardous material. In addition, these techniques are relatively expensive as well as time consuming.

Chelex-100® is a well-known chelating ion-exchange resin trademarked by Bio-Rad Laboratories of Richmond, Calif. It is a bidente ligand having the chemical name iminodiacetic acid mounted on a divinyl benzene substrate. Chelex-100® has many applications, and is generally used to preconcentrate metals out of brine solutions. This resin has the advantages over the other materials currently in use for separating yttrium-90 from its parent strontium-90. These advantages include high loading capacity, increased flow rate, as well as its comparative inexpense. Table 1 shows a variety of metals that can be preconcentrated on Chelex-100® resin from various samples. It is noted that there is no listing for the radionuclides Sr-90 or Y-90.

TABLE 1

Preconcentration of Metals on Chelex-100 ® Resin

| METAL | SAMPLE | REFERENCE |
|---|---|---|
| Cd, Co, Cr, Cu, Fe, Mn, Mo, Ni, Sc, Sn, Th, U, V, Zn | Natural waters | Kingston et al. Anal. Chem., 55, 1160 (1983) |
| Cd, Zn, Pb, Fe, Mn, Cu, Ni, Co, Cr | Seawater | Sturgeon, et al., Anal. Chem., 52, 1585 (1980) |
| Cd, Ce, Co, Cu, Fe, Mn, Mo, Ni, Pb, Sc, Sn, Th, U, Zn | Seawater | Kingston et al., Environ. Inter., 10, 153 (1984) |
| Fe, Mn, Cu, Ni, Cd, Pb, Zn | Seawater | Paulson, Anal. Chem., 58, 183 (1986) |
| Fe, Zn, Mn | Biological Materials | Pella et al., Anal. Chem., 55, 1193 (1983) |
| V | Biological Materials | Fassett et al., Anal. Chem., 57, 2474 (1985) |
| Cd, Co, Cu, Fe, Mn, Ni, Pb, Zn | Natural waters | Kingston, Quantitative Ultratrace Transition Metal Analysis of High Salinity Waters Utilizing Chelating Resin Separation, National Technical Information Service, Springfield, VA (1979) |

TABLE 1-continued

Preconcentration of Metals on Chelex-100 ® Resin

| METAL | SAMPLE | REFERENCE |
|---|---|---|
| Th, Pa, U, Te, Zr, Nb | Waste waters | El-Sweify et al., Radiochem. Acta, 38, 211 (1985) |
| Fe, Au, Ga, Th, Sb | Hydrochloric acid solution | Koshima, Anal. Sci., 2, 255 (1986) |
| Cd, Ce, Co, Cr, Cu, Fe, Mn, Mo, Ni, Pb, Sc, Sn, Th, U, Zn | Natural waters | Kingston, et al., The Characterization of the Chesapeake Bay: A Systematic Analysis of Toxic Trace Elements, NBSIR 83-2698 (1983) |
| As (V), As (III) | Industrial solutions | Chandra, et al, Reactive Polymers, 8, 85 (1988) |
| Cu, Cd, Mn, Zn, Pb | River water | Liu et al., Anal. Chem., 61, 525 (1989) |
| Arsenate, Arsenite | Industrial effluents | Chanda et al., Reactive Polymers, 8, 85 (1988) |
| Cu, Cd, Zn | Natural waters | Liu et al., Anal. Chem., 61, 520 (1989) |

Accordingly, it is an object of the present invention to separate Yttrium-90 from Strontium-90 quickly and efficiently, and without the use of hazardous materials.

It is another object of the present invention to provide a fast and economical chromatographic method for the analysis of Strontium-90/Yttrium-90 in environmental waste streams.

SUMMARY OF THE INVENTION

A method for selectively removing yttrium-90 from its parent strontium-90 contained in an environmental sample may include loading the sample onto a column containing a chelating ion-exchange resin capable of retaining yttrium-90; washing the column with a solution capable of removing strontium, calcium, and other contaminants from the yttrium-90 fraction retained on the column; removing excess acetate salts from the column; eluting yttrium-90 solution from the column and adjusting the pH of this solution to about 2.7; filtering the yttrium-90 solution and weighing this solution for gravimetric yield; and, counting the yttrium-90 containing solution with a radiological counter for a time sufficient to achieve the statistical accuracy desired.

The chelating ion-exchange resin is preferably a bidente ligand having the chemical name iminodiacetic acid mounted on a divinyl benzene substrate, converted from sodium form to ammonia form.

DETAILED DESCRIPTION OF THE INVENTION

The procedure disclosed herein is for the determination of Strontium-90 (Sr-90), via its daughter, Yttrium-90 (Y-90), contained in environmental samples. For purposes of this application, an environmental sample that is used to obtain Y-90 from Sr-90 is one that is obtained from any source having an activity level of 5 milli-rem/hr or less. The disclosed invention will work for higher activity levels, but not as well. The procedure is based on the principle that yttrium can be selectively removed from the sample and then counted. The yttrium activity is an indirect measure of the strontium-90 activity originally present in the sample.

A condition of the procedure is that all samples are in a weakly acidic solution prior to using the method. The minimal detectable activity (MDA) for Sr-90 in water given a 1 L sample, 97% yield, and a 50 minute count time is $2.7 \times 10^{-5}$ Bq/mL (0.7 pCi/L). The MDA for vegetation and soil samples, given a 10 g sample, 97% yield, and a 50 minute count time is $2.7 \times 10^{-3}$ Bq/g (73 pCi/kg). The MDA for filters is $2.7 \times 10^{-2}$ Bq/Sample.

Strontium-85 tracer is added to the sample prior to dissolution of the sample. Yttrium and rare earth hydroxides are removed with an iron hydroxide scavenge. After a suitable grow-in period between 5 and 21 days, the solution is pH adjusted for yttrium loading on a Chelex-100® column. After loading, interferences are washed through with 1M ammonium acetate. Yttrium is selectively removed in 1M nitric acid. Yttrium oxalate is precipitated, mounted, and counted using a low background alpha-beta gas proportional counter. The yttrium activity is an indirect measure of the strontium-90 activity originally present.

With the framework as set forth above, the specific procedure for the selective removal of yttrium from a sample containing strontium-90 follows.

Concentration of Sr-90

The concentration of Sr-90 is a procedure that is well known but is included herein for informational purposes.

The sample begins the procedure in a weak acidic solution of $HNO_3$ or HCl. All samples have 1–2 mL of Sr Carrier and about 1 mL of Sr-85 tracer. About 5 mL of saturated $Na_2CO_3$ are added to the sample to precipitate $SrCO_3$. A sufficient amount of concentrated $NH_4OH$ is then added to the sample to assure that the sample is basic. 0.5 mL should be a sufficient amount for this purpose.

When the sample is basic, it is transferred to a 50 mL centrifuge tube and centrifuged for 5–15 minutes. Several transfers to the centrifuge are made to concentrate the sample to 1 test tube each. If the precipitate is more than 1 inch deep, it is dissolved in 3M $HNO_3$, and these steps are repeated. The solution is saved for the possible further recovery of Sr-85, and concentrated $HNO_3$, about 2–3 drops, is then added to the precipitate.

Next, the carbonate precipitate is dissolved by adding a sufficient amount of $H_2O$. Normally, 3–5 mL of $H_2O$ should dissolve the precipitate. If the precipitate does not dissolve, it may be necessary to adjust the pH of the solution to below pH 3, or centrifuge the sample, and check the precipitate for Sr-85. Once the precipitate is dissolved, dilute solutions of each tube are prepared to make working volumes of approximately 10 mL.

An iron carrier in the amount of about 1 mL is added to each sample, and sufficient concentrated $NH_4OH$ is added to precipitate $Fe(OH)_3$, $Y(OH)_3$, and other rare earth hydroxides. This step removes most rare earth hydroxide interferences. If it is expected that there is significant rare earth contaminations, as in a soil sample, the addition of the iron carrier to remove the rare earth hydroxide interferences may be performed more than once. The start of the Y-90 grow-in begins by heating the sample in a hot water bath for about 5 minutes, centrifuging the hot sample for 5–15 minutes and then decanting and saving the supernate in a clean 50 mL centrifuge tube. The precipitate, containing the rare earth and Fe hydroxides, is washed with about 1–2 mL of 3M $NH_4OH$, heated in a hot water bath for about 5 minutes, and centrifuged for 5–15 minutes to increase the amount of Strontium. The washed solution is decanted into the 50 mL centrifuge tube containing the supernate. The supernate is now a purified Strontium fraction in which the yttrium-90 grow-in will take place.

An Yttrium carrier, prepared by dissolving $Y_2O_3$ in concentrated $HNO_3$ and diluted with water, is weighed in to the solution, and the volume of this solution is adjusted by dilution or concentration, to that of a Sr-85 comparator and then counted for Sr-85 yield.

At this point, it is necessary to check the pH of the solution to assure that the sample is between pH 6.8 and 7.0 while it is growing. Yttrium will be lost if the sample is more acidic or basic. If the pH is in this range, the remaining samples are adjusted accordingly. The sample is now set aside for Y-90 growth, for 5–21 days. Once the Sr-85 yield is acceptable, all decanted supernates are discarded.

Separation of Contaminants from Y-90

Prior to the separation of contaminants from the Y-90, the Chelex-100® resin and the chromatographic column are prepared. Chelex-100® is only available in sodium form and needs to be converted to ammonia form for Y-90 separation. The is done by washing sodium form Chelex-100® with a 3M solution of $NH_4OH$, and then passing the $NH_4OH$ through the resin at least two additional times. The resin is washed with water having a pH between 7 to 8. A sufficient amount of the resin is then slurried with water for dispensing into the columns to make a resin bed that is about 65 mm in height. The column is preconditioned to the required loading conditions by a wash of 1M $NH_4OAc$ having a pH of 7. It is necessary that the effluent have a pH between 6.8 and 7.2.

After Y-90 grow-in, each sample is loaded onto a Chelex-100® column, and when the sample solution has completely passed through, the column is washed with 1M $NH_4OAc$ having a pH equal to 7. This $NH_4OAc$ wash removes all strontium, calciums and other contaminants from the yttrium fraction. To remove excess acetate salts, water is passed through the column after the acetate wash has completely passed through.

Yttrium-90 solution is now eluted into a centrifuge tube from each column with 1M $HNO_3$. It is necessary that the eluted solution be acidic to obtain yttrium-90, and this can be checked by adding drops of thymol blue to each tube. 5% oxalic acid is added to each sample for adjustment purposes. It is understood that each set of samples is run with standard quality assurance requirements. A control and a blank are prepared and analyzed in the exact same manner as the samples are analyzed. Accordingly, at this stage, 3M NH4OH is added dropwise to the blank until the solution is brought to a pH of about 2.7 (faint pink to yellow).

Each Yttrium-90 solution is heated in a water bath for about 3 to 7 minutes, and then filtered with a tare weighed Whatman 25 mm filter. The filter paper is dried at 40 degrees C. for about 4 minutes, cooled, and weighed for gravimetric yield. The sample is then counted with a radiological counter, such as a low background alphabeta, gas proportional counter. The counting takes place for a time sufficient to achieve the desired statistical accuracy.

The strontium results are calculated using the following equations:

$$Sr_{90} = \frac{(Cy - By) * CF * DF}{R_y * R_s * E_Y * V * Q_2 * (Q_1 - Q_3)}$$

where:

$Sr_{90}$ = Activity of $^{90}Sr$ in the sample in the applicable units.

$C_y$=Counts per second for the sample for the yttrium oxalate.

$B_y$=Counts per second for the blank for the yttrium oxalate.

CF=A conversion factor used to convert the counting results to units required in the reported results.

DF=Dilution factor corresponding to the relationship between the original sample and the amount of sample counted.

$R_y$=Recovery of the yttrium oxalate (ratio of the mass of yttrium oxalate collected on the filter to the expected mass of yttrium oxalate on the filter.

$E_y$=Efficiency of counter for yttrium oxalate mass on planchet.

V=Volume of sample prepared for analysis $Q_1$=Decay correction for strontium decay between start and end of $^{90}Y$ grow-in $Q_2$=Decay correction for yttrium decay between end of $^{90}Y$ grow-in and counting of $^{90}Y$ $Q_3$=Decay correction for yttrium decay between start and end of $^{90}Y$ grow-in.

The relative uncertainty in the activity of the sample is calculated using the following equations:

$$U_{Sr_{90}} = \sqrt{U_y^2 + U_b^2 + U_E^2 + U_{Yy}^2 + U_{Ys}^2 + U_d^2 + U_v^2 + U_n^2}$$

where:

$U_{Sr_{90}}$=The relative uncertainty corresponding to one standard deviation of the calculated activity for $^{90}Sr$ from the yttrium oxalate.

$U_y$=The relative uncertainty of the counts of the sample calculated from the square root of the gross counts divided by the gross counts in the integrated area of the peak.

$U_b$=The relative uncertainty of the counts of the background calculated from the square root of the gross counts divided by the gross counts in the integrated area of the background.

$U_E$=The relative uncertainty of the counting efficiency, including uncertainty in the standard.

$U_{Yy}$=The relative uncertainty in the yield of the yttrium. This value is set a 2% due to the precision of the balance, the preparation of the carrier.

$U_{Ys}$=The relative uncertainty in the yield of the strontium. This value is set at 2% due to the precision of the balance, the preparation of the carrier, or the comparison between the sample and comparator.

$U_d$=The relative uncertainty in the decay factors and the ingrowth corrections. This value is set at 0.3%

$U_v$=The relative uncertainty of the initial sample volume measurement and dilutions and transfers. This value is set at 3% due to the number of sample transfer steps.

$U_n$=The relative uncertainty in the counting statistics as referenced to the current background value. As the sample count rate approaches background, the error increases exponentially. When the sample count rate is approximately three times the one sigma value of the background, this term becomes insignificant. It is calculated using the following equation:

$$U_n = \frac{\sqrt{\frac{C_y}{T} + \frac{C_b}{T}}}{C_y - C_b}$$

where T is the time the samples are counted in minutes.

The absolute uncertainty is calculated by multiplying the relative uncertainty by the calculated activity.

The detection limit DL of the analyses are calculated using the following equations:

$$DL(^{90}Sr) = \frac{[2.71 + (4.65 * \sqrt{C_b * T_1})] * CF * DF}{T * R_y * R_s * E_y * V * Q_2 * (Q_1 - Q_3)}$$

where $T_1$ is the total seconds yttrium oxalate was counted, and $T_2$ is the total seconds strontium sulfate was counted.

If the calculated analysis result is below the calculated detection limit, the result is reported as less than the detection limit.

For each standard counted, the efficiency is calculated using the following equation:

$$EFF. = \frac{\left[\left(\frac{C}{S}\right)_{std} - \left(\frac{C}{S}\right)_{Blk}\right] * R}{\text{Std. Value} * e^{-\lambda t}}$$

where

Std. Value=the disintegrations per second for the standard at $T_0$ $e^{-\lambda t}$=decay correction for the time elapsed between $T_0$ and the time of counting (C/S)std=the counts per second for the standard (C/S)blk=the counts per second for the blank R=the chemical recovery of the strontium or yttrium added.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which an exclusive property of privilege is claimed are defined as follows:

1. A method for selectively removing yttrium-90 from its parent strontium-90 contained in an environmental sample comprising:

a) loading the sample onto a column containing a chelating ion-exchange resin capable of retaining yttrium-90;

b) washing the column with a solution capable of removing strontium, calcium, and other contaminants from the yttrium-90 fraction retained on the column;

c) removing excess acetate salts from the column;

d) eluting yttrium-90 solution from the column and adjusting the pH of this solution to about 2.7;

e) filtering the yttrium-90 solution and weighing this solution for gravimetric yield; and, f) counting the yttrium-90 containing solution with a radiological counter for a time sufficient to achieve the statistical accuracy desired;

whereby contamination free yttrium-90 is obtained.

2. The method of claim 1 wherein the chelating ion-exchange resin is a bidente ligand.

3. The method of claim 2 wherein the bidente ligand has the chemical name iminodiacetic acid mounted on a divinyl benzene substrate.

4. The method of claim 3 wherein the iminodiacetic acid mounted on a divinyl benzene substrate is converted from sodium form to ammonia form prior to when the sample is loaded on the column.

* * * * *